Sept. 13, 1960 R. SMITH-JOHANNSEN 2,952,761
ELECTRICALLY CONDUCTIVE LAMINATED STRUCTURE
AND METHOD OF MAKING SAME
Filed April 2, 1957
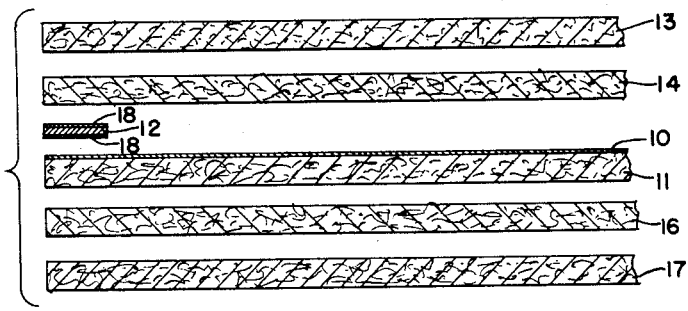
FIG. 1
FIG. 2
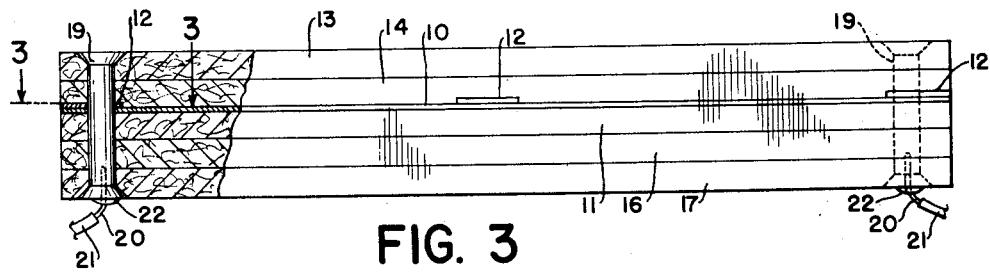
FIG. 3
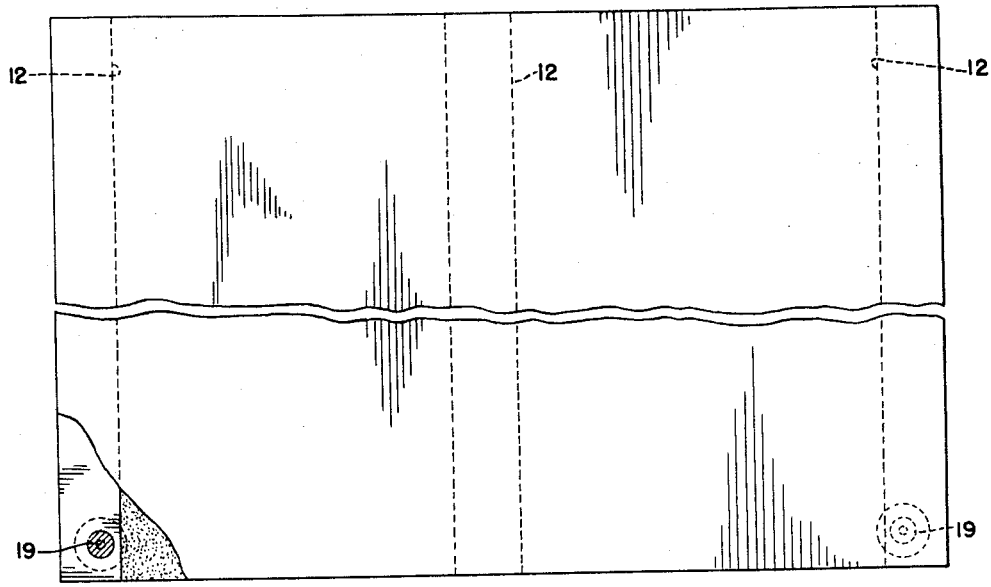
FIG. 4    FIG. 5
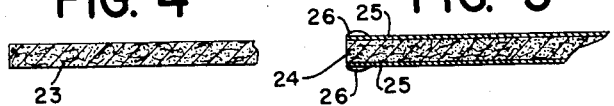
INVENTOR
ROBERT SMITH-JOHANNSEN
ATTORNEYS United States Patent Office 2,952,761
Patented Sept. 13, 1960

2,952,761
ELECTRICALLY CONDUCTIVE LAMINATED STRUCTURE AND METHOD OF MAKING SAME

Robert Smith-Johannsen, Niskayuna, N.Y., assignor, by mesne assignments, to Chemelex, Inc., Niskayuna, N.Y., a corporation of New York Filed Apr. 2, 1957, Ser. No. 650,152

18 Claims. (Cl. 219—19)

This invention relates to electrically conductive laminated structures and, more particularly, to a substantially unitary and homogeneous laminated structure wherein each layer of the laminate is bonded and integrated with adjoining layers by a bonding agent, and one of the layers comprises a porous electrically conductive layer. The present invention is based upon the discovery that a porous electrically conductive body or film can be incorporated into a laminated structure as a composite and homogeneous part thereof. Due to the porosity of the conductive layer, the bonding agent can be impregnated through the conductive composition to integrate the entire laminated structure. Even under the greatest impregnating pressures such a conductive composition remains structurally intact and its conductive properties are unimpaired.

The laminates produced according to this invention are useful as heating elements in a wide variety of fields including space heating panels for homes and buildings, warming trays and shelves, portable space heaters, dryers, cartridge heaters, hot water heaters, and the like.

The formation of laminated structures of many different shapes and sizes is a well-known art. These laminated structures generally have a protective and decorative function and are used for many different purposes such as table tops, counter tops, electrical insulation, wall panels, cabinets, etc.

The most common laminates consist of two or more layers of reinforcing material bonded together with synthetic resin under heat and pressure to form a dense homogeneous product.

This invention broadly involves the incorporation of at least one layer of a porous electrically conductive structure into such laminates resulting in the formation of a dense homogeneous laminate having a heating function in addition to the protective and decorative functions of the conventional laminates.

The porous conductive structures can be laminated into various thermosetting or thermoplastic laminates including those formed from filled or reinforced phenol-formaldehyde resins, melamie-formaldehyde resins, silicone resins, epoxy resins, polyester resins, polyethylene, and the like. Inorganic bonding agents such as zinc and aluminum phosphate and Portland cement can also be used especially if it is desired to operate the laminated heating elements at temperatures in excess of the melting or decomposition point of the resinous bonding agents or to form low-cost elements.

Various fillers or reinforcing materials can be used with the organic and inorganic bonding agents as is well known in the art including light- and heavy-weight cotton fabric, paper such as rag paper, kraft, alpha-cellulose, cotton mat, wood, glass fabric, quartz fibers, fibrous glass mat, asbestos fiber, asbestos paper, synthetic fibers such as nylon fabric as well as fillers of the type represented by ground mica, alumina, graphite, and carbon black.

Various combinations of filler and reinforcing materials and resins can be used. Some more advantageous combinations include paper-phenol-formaldehyde, paper-melamine-formaldehyde, glass-epoxy, and glass-silicone.

Porous conductive films which can be used according to this invention can be made in various manners including those described in my copending applications Serial No. 351,731, filed April 28, 1953, now Patent No. 2,803,-566, and Serial No. 634,821, filed January 18, 1957.

One method of forming porous conductive structures which is described in my copending application Serial No. 351,731, now Patent No. 2,803,566, involves the formation of an aqueous paint containing an aqueous suspension of colloidal silica and electrically conductive particles such as graphite. The type of silica used in forming the paint is important and it is advantageous to use a silica of the type marketed by E. I. du Pont de Nemours under the trade name Ludox.

Ludox colloidal silica is a trade name for a well-known type of colloidal silica and as marketed is generally composed of 29–31% $SiO_2$, 0.29 to 0.39% $Na_2O$, a maximum of 0.15% sulfates as $Na_2SO_4$, and the remainder of water. Various manners of producing an aqueous colloidal silica of the Ludox type are described in United States Patent Nos. 2,224,325, 2,574,902, and 2,597,872. Ludox colloidal silica can be prepared in various forms as described in these patents. One of the more important properties of the colloidal silica of type represented by Ludox is that the alkali is present as a stabilizer for the silica sol and is not uniformly distributed throughout the silica particles as it is in conventional silicates such as water glass but is substantially all outside the silica particles. Another example of the colloidal silica which can be used according to this invention is marketed by Monsanto Chemical Company under the trade name Syton.

After the paint has been formed in proper proportions so as to render the structures formed therefrom electrically conductive as is described in my above-noted copending applications, it can be applied to various insulating surfaces as a coating or as an impregnant or combined with various reinforcing materials such as cellulose and asbestos fibers. For example, the paint can be applied to asbestos sheeting by means of a silk screen process, brushing, or spraying. If a more porous base is used it can be dipped into the paint to cause complete impregnation thereof.

Examples of surfaces and reinforcing materials which can be used with the paint to form conductive structures include cotton fabrics, papers, cellulosic fibers, cotton mats, glass fabrics and mats (desized), asbestos fibers and papers, synthetic fibers such as nylon fabrics, as well as non-porous materials upon which the paint can be coated such as plastic structures and coatings.

The paint can also be incorporated into the beater of a paper machine by first placing a positive charge on the cellulosic or asbestos fibers, then adding the negatively charged Ludox colloidal silica particles and then the graphite. The aqueous suspension can then be formed into paper by conventional paper making techniques.

The paint readily air-dries to form a porous conductive structure which can be directly used as the porous conductive layer of a laminate.

The porous conductive structure produced as described above can be made in various sizes and shapes. The paint can be applied and dried directly on, or impregnated in, a formed object such as rods, cylinders, hollow objects such as tubes, as well as other various shapes. The paint can also be incorporated in the form of flat objects such as paper and cellulosic and asbestos fiber sheets and subsequently formed into the desired shape while still wet either before or during the laminating operation. Wet fibrous masses can be prepared containing the graphite and silica and these masses can also be molded into the desired shape such as a muffin pan.

The porous conductive structures so formed can also be impregnated with various natural and synthetic resins and thus impart to the conductive structure some of the properties of the impregnant such as flexibility and the impregnated conductive structure used directly as the conductive layer of the laminate.

Various natural and synthetic resins commonly used in protective coatings and paints can be used to impregnate the conductive structures including phenolic resins such as phenol-formaldehyde resins, melamine-formaldehyde resins, alkyl resins, silicone resins and rubbers such as polydi- and trimethylsiloxane, epoxy resins, vinyl resins, polyethylene, styrene-butadiene, polyester resins, etc. Inorganic impregnants such as zinc and aluminum phosphate and Portland cement can also be used. The choice of resin impregnant depends largely upon the properties of the conductive structures desired such as flexibility and operating temperature.

The laminated structures of this invention comprise at least one layer of such porous electrically conductive films or structures having electrodes positioned in electrical contact upon its surface. At least one outer sheet covers the electrodes and surface of the porous conductive layer. The outer sheets and the porous conductive layer are bonded together by a bonding and impregnating agent which integrates the electrodes and the electrically conductive layer into a substantially unitary and homogeneous laminated structure. The outer sheets may be composed either entirely of a self-supporting impregnant or of a fibrous material saturated with an organic or inorganic impregnant.

This invention includes laminates of the conductive layers themselves which have no insulating layers laminated therewith as well as laminates in which insulating layers are laminated on one outer side or face only and with insulating layers laminated between layers of conductive material as a sandwich.

The conductive laminates which are only partially insulated or entirely uninsulated can be used as heating elements by attaching electrodes thereto during the lamination process as herein disclosed. They are also useful for bleeding off electrostatic charges. The uninsulated laminates can be used, for example, as floors in operating rooms to prevent explosions due to the build up of electrostatic charges. When used in this manner, it is of course not necessary to apply electrodes to the laminates.

The uninsulated conductive laminates contain conductive material and are conductive throughout. They can be formed in the same manner as the insulated laminates as disclosed herein by using all conductive layers to form the laminate or by inserting an insulating layer between the conductive layers or on one outside face thereof. The conductive layers can be impregnated or coated with the adhesive which will penetrate throughout the porous conductive layers to form the homogeneous laminate.

Electrically conductive compositions containing a dispersion of non-alkaline colloidal silica particles and electrically conductive particles are particularly advantageous for forming the porous conductive structures which are laminated according to this invention. After being air-dried this material is self-supporting and sufficiently porous to permit an impregnating agent to pass therethrough. A laminated structure incorporating such a conductive composition is characterized by exceptional strength and electrical conductive properties.

The method of making such an electrically conductive laminated structure broadly comprises first positioning the electrodes on the porous electrically conductive layer in electric contact therewith. The electrodes and each surface of the porous conductive layer are then covered with at least one outer layer. The outer layer and the porous conductive layer are then placed in a laminating press and bonded together under either low or high pressure and temperature with a bonding and impregnating agent depending on the requirements of the agent. The electrodes and the electrically conductive layer are thereby integrated into a substantially unitary homogeneous laminated structure along with the outer sheets.

The exact manner by which the conductive layer is incorporated into the laminate will vary depending upon the particular structure of the conductive layer itself. When the conductive structure does not contain a resin impregnant it can be laminated by replacing one of the layers of a conventional laminate with the conductive structure and inserting at least one resin-rich layer adjacent to the conductive structure and opposite to the side of the conductive structure upon which the electrodes are laid. In this manner when the laminate is formed, the resin from the resin-rich layer will flow through the porous conductive structure to the resin layer on the other side of the conductive structure to form a unitary homogeneous laminate. When using a conductive structure containing no resin impregnant, it is also advantageous to insert resin-rich layers on both sides of the conductive structure. The amount of resin in the resin-rich layer is not critical. It is only necessary that there be enough resin present therein to insure an adequate homogeneous laminate when formed.

When the conductive structure is impregnated with a resin, it is not necessary to utilize resin-rich layers adjacent the conductive layer so long as there is a sufficient amount of resin impregnated into the conductive structure to insure a strong and unitary homogeneous final laminate.

If the conductive paint is applied to a non-porous backing such as silicone resin, the face opposite the conductive film can operate as a face of the resulting laminate. In any event, the backing material itself will flow through the conductive film to the layer on top of the conductive layer to form a homogeneous laminate.

This invention includes the discovery that due to the porosity of the conductive structure or layer it is possible to obtain good adhesion of the electrodes to the conductive layer and at the same time good electrical contact between the electrodes and the conductive layer.

Where a conductive structure is used containing no impregnant, the impregnant from the impregnant-rich adjacent layer flows through the porous conductive layer under the influence of the laminating heat and pressure into contact with the side of the electrode facing the conductive layer in a sufficient amount to strongly adhere the electrode to the face of the conductive layer. The electrodes are primarily adhered to the conductive layer through the voids therein. The laminating pressure maintains the contact of the electrode with the conductive portion of the conductive layer and insures good electrical contact therewith. The laminating pressure is sufficient to prevent the flow of the adhesive impregnant between the electrical contact points of the electrode and the conductive layer.

Where a conductive structure or layer is used containing an impregnant fundamentally the same principle applies. Due to the laminating heat and pressure the impregnant is forced from between the electrodes and the conductive layer and into the pores of the porous conductive layer causing good electrical contact therebetween and also good adhesion by partial adhesive contact with the electrode through the pores of the conductive layer.

If adhesion between the electrodes and the particular resin and bonding agent used to form the laminate is difficult to obtain, the electrodes can be coated with an adhesive which is compatible with the resin impregnant or bonding agent to effect the bonding of the electrodes in the laminate. For example, phenolic resin is very difficult to bond to copper, but by coating the copper electrodes with a compatible adhesive such as vinyl butyral, adequate adhesion can be obtained. When it is necessary or desirable to coat the electrodes with a compatible adhesive and the electrodes are first laid upon the conductive layer, there is no electrical contact due to the adhesive insulation. However, when the structure is laminated the heat and pressure used to form the laminate force the adhesive away from the copper permitting electrical contact with the conductive layer in the same manner as described with respect to the adhesive impregnated conductive layer.

Normally any excess resin present during the laminating process will be squeezed out of the laminate, and it will of course be obvious to those skilled in the art that if the conductive layer or resin-rich layers are overloaded with adhesive, it may not be possible to obtain adequate electrical contact with the conductive structure since excess adhesive or laminating bonding agents will cause insulation between the electrodes and the conductive layer if it cannot be or is not squeezed out. The adhesive impregnant will flow along the path of least resistance and the amount of ahesive or bonding impregnant should always be maintained at a level so that it will flow through the porous conductive layer or other layers in the laminated structure during the laminating procedure and not be forced between the electrodes and the conductive layer in sufficient amounts to cause insulation therebetween or significantly disrupt the electrical contacts. Sufficient adhesive or bonding impregnant should be used however to insure a strong unitary homogeneous laminate which will not delaminate when used for its intended purpose.

Electrodes can be incorporated into the conductive laminates by merely laying them at appropriate places on the conductive layer and laminating them together with the other layers. The position of the electrodes can be used to vary the resistance across the conductive layer.

Various types of electrodes can be incorporated into the conductive laminates of this invention as will be apparent to those skilled in the art including solid silver, aluminum, nichrome, copper, etc. as well as other various metallic forms such as wire mesh and perforated foil. If copper is used it can be plated with silver for example to prevent oxidation.

A preferred embodiment of the laminated structure according to this invention is discussed hereinbelow and illustrated in the accompanying drawing, wherein:

Fig. 1 is an exploded vertical section of one end of the laminated structure;

Fig. 2 is an elevation partly in section of the finished laminated structure;

Fig. 3 is a broken plan view of the laminated structure including a corner section taken substantially along the line 3—3 of Fig. 2;

Fig. 4 is an exploded vertical section of a conductive layer having the conductive material impregnated into a porous structure; and Fig. 5 is an exploded vertical section of a heating element formed by laminating a porous conductive layer between sheets of metal foil.

Referring first to Fig. 1, a film of porous electrically conductive composition 10 is applied to one surface of a fibrous backing sheet 11. Along each edge and the centerline of the conductive film, an electrode 12 is positioned as seen in Figs. 2 and 3. Each electrode is a thin strip of a metal having high electrically conductive characteristics. Two upper outer insulating sheets 13 and 14 of fibrous material cover the electrodes and the electrically conductive composition, and two lower outer insulating sheets 16 and 17 of fibrous material are placed under the backing sheet 11. Each of the four outer sheets is saturated with an impregnant such as a phenol-formaldehyde resin. If the impregnant is not compatible with the metal of the electrodes, a compatible adhesive 18 may be applied on the lower and upper surfaces of the electrodes to properly adhere the electrodes in place.

The layers illustrated in Fig. 1 are positioned in a laminating press and are integrated under heat and pressure into the finished laminated structure illustrated in Figs. 2 and 3. As pressure is applied, the impregnant in the upper outer sheets 13 and 14 is forced into and through the porous electrically conductive layer 10 into the backing sheet 11, and the impregnant in the lower outer sheets 16 and 17 is forced directly into the backing sheet and through the conductive layer. If an adhesive-impregnant 18 is used, it also passes through the conductive layer 10. The electrodes 12 are thereby totally embedded in the laminated structure. It is to be noted that the porous conductive layer retains its composite structure whether conventionally high or low laminating pressures are applied during the laminating operation.

When forming uninsulated laminates of conductive layers only, the sheets 11, 13, 14, 16 and 17 can all be formed of porous materials impregnated with the porous conductive composition such as that illustrated in Fig. 4. One or more layers should also be impregnated or coated with an adhesive or bonding agent in a sufficient amount to form a strong homogeneous structure. The electrodes 12 could either be eliminated or adhered to an outer face of either layer or sheet 13 or 17, depending upon the use desired.

When forming a laminate having an insulating layer in the middle, an insulating layer is merely substituted for the conducting layer 10 while replacing conductive layers for sheet 13, 14, 16 and 17. Partially insulated conductive laminates can be made by using only one insulating layer in the laminate such as layer 17.

Fig. 4 shows a conductive layer 23 formed of a silica-graphite conductive structure impregnated into a fibrous sheet. This conductive layer can also be formed by incorporating the silica, graphite and fibers together and forming it on a paper or forming machine. This conductive layer can be substituted for the elements 10 and 11 in Fig. 1.

I have also found that the conductive structures can be laminated between metallic foil which acts as electrodes. The positive and negative connections are made to opposite electrodes and the current then passes through the conductive film instead of across it as shown in the drawing. In this manner different size laminates can be made such as strips about 1/16 of an inch wide and 12 inches long with increased efficiency so long as the resistance of the conductive layer is sufficiently high. Fig. 5 shows such a heating element where the conductive layer 24 is sandwiched and adhered between copper-foil electrodes 25 having means 26 attached thereto for connection to a suitable source of electrical power.

When using a conductive structure containing an adhesive impregnant, I have also found that the electrodes can be directly adhered to the impregnated conductive layer before it is laminated to form a composite conductive layer which can be directly incorporated into the conventional laminate. This can be accomplished by warming the impregnated conductive layer sufficiently to render the impregnant tacky, placing the electrodes thereon, and permitting the resin impregnant to cool. In this manner, a composite conductive structure having electrodes already adhered thereto can be formed which would facilitate handling in the production of the conductive laminate of this invention.

After the laminate has been formed and the bonding agent cured, electrical connections can be made to the electrodes to produce a potential across the conductive layer. Connections can be made to the electrodes in various manners as will be apparent to those skilled in the art. The manner shown in the drawing consists of punched or drilled holes in the laminate at each corner of the laminate through the electrodes. The holes are then countersunk and an oversized rivet 19 is forced into each hole to provide good electrical contact with the metal electrode 12. The stripped ends 20 of conductors 21 are then welded at 22 to each of the rivets 19. When the conductors 21 are placed in an electric circuit, current is carried through one rivet into its associated electrode and thence across the conductive film 10 to the opposite rivet. Another method of forming the contact is to drill a hole down to the electrode and solder the connection directly. This gives an insulated surface on one side.

An example of specific materials and methods for making the electrically conductive laminated structure contemplated by this invention is discussed below in detail.

*Example*

A porous electrically conductive composition was prepared by thoroughly mixing 55 pounds of a colloidal silica containing about 30% $SiO_2$ and marketed under the trade name Ludox by du Pont and 27 pounds of Electric Furnace graphite. This mixture was coated on a dry, wet strength paper backing sheet and was then air-dried. The coated paper was cut into 38 x 45 inch sheets to conform to the size of the laminating press. Three parallel ¾ inch wide strips of thin copper foil, 0.0012 inch thick, were laid directly on the electrically conductive composition on 10 inch centers across the sheet of coated paper. Each copper strip was coated on both sides with a vinyl butyral adhesive which is compatible with copper and insures a good bond between the metal of the electrode and the phenolic paper structure. One intermediate sheet of paper saturated with phenolic resin was then placed on each side of the coated paper backing sheet, two additional intermediate sheets of phenolic impregnated paper were positioned on each side of the phenolic saturated sheets, and finally one outer sheet of melamine impregnated paper was inserted on each side as surfacing.

These layers were laminated in a press and heated at 1500 p.s.i. for 45 minutes at 325° F. and were subsequently cooled in the press. The finished laminated structure was then sawed into sections along the centerline of the copper electrodes leaving an electrode approximately ⅜ inch wide embedded in each section. Twelve 10 x 12 inch laminated structures were thereby produced.

The electrode leads were applied to a conventional 110 volt household power supply and it was found that the temperature of the surface of the laminated structure rose rapidly to about 100° C. and remained at that temperature without variation.

The conductivity or resistance of the conductive laminate can be controlled by varying the amount of graphite used to form the conductive layer as is described in my copending application Serial No. 351,731. The resistance of the conductive laminate can also be controlled by plying two or more conductive layers of predetermined resistance in the final laminated structure. As the number of plies is increased, the resistance of the resulting laminate is correspondingly decreased. Since the conductive layers retain their porous composite nature, no film or bonding impregnant remains between such conductive plies to impair electrical conductivity across the abutting surfaces.

Laminated structures can be formed according to this invention in the form of sheets, rolled tubes, molded tubes and rods in the same manner as conventional protective laminates are formed as well as in other various shapes.

I claim:

1. A laminated heating element comprising at least one porous electrically conductive layer composed of electrically conducting particles bonded together in an open continuous structure, electrodes positioned upon the porous conductive layer in electrical contact therewith, at least one outer layer covering each surface of the porous conductive layer, and a bonding agent impregnated and distributed throughout the porous conductive layer and the outer layers to form a substantially unitary and homogeneous laminated heating element, said conductive layer possessing electrical conductivity independent of said bonding agent.

2. The laminated heating element of claim 1 in which the porous conductive layer is inorganic and possesses electrical properties independent of and inert to the bonding agent.

3. A laminated heating element comprising at least one porous electrically conductive layer containing graphite particles dispersed throughout and bonded to non-alkaline colloidal silica particles in an open continuous structure, electrodes positioned upon the porous conductive layer in electrical contact therewith, at least one outer layer covering each surface of the porous conductive layer, and a bonding agent impregnated and distributed throughout the porous conductive layer to form a substantially unitary and homogeneous laminated heating element, said conductive layer possessing electrical conductivity independent of said bonding agent.

4. The laminated heating element of claim 3 in which the bonding agent is a synthetic resin.

5. The laminated heating element of claim 4 in which the synthetic resin is phenol-formaldehyde.

6. A laminated heating element comprising at least one porous fibrous layer containing a porous electrically conductive structure composed of electrically conducting particles bonded together in an open continuous structure, electrodes positioned upon said porous conductive fibrous layer in electrical contact therewith, and at least one outer layer covering the electrodes and each surface of the porous conductive fibrous layer, and a bonding agent impregnated and distributed throughout the porous conductive layer and the outer layers to form a substantially unitary and homogeneous laminated heating element, said electrically conductive structure possessing electrical conductivity independent of said bonding agent and said porous fibrous layer.

7. The laminated heating element of claim 6 in which said outer layers are fibrous.

8. The laminated heating element of claim 7 in which the electrically conductive portion of the porous fibrous electrically conductive layer is inorganic and possesses electrical properties independent of and inert to the fibrous portion of the conductive layer and the bonding agent.

9. A laminated heating element comprising a porous backing sheet, at least one layer of porous electrically conductive composition composed of electrically conducting particles bonded together in an open continuous structure applied to at least one surface of said backing sheet, said electrically conductive composition containing graphite particles dispersed throughout and bonded to non-alkaline colloidal silica particles, electrodes adhered in electrical contact to said layer of electrically conductive composition, at least one adjoining intermediate sheet of fibrous material covering said electrodes and said layer of electrically conductive composition, each of said backing sheet, layer of porous electrically conductive material, and intermediate sheet being impregnated and homogeneously bonded together with a phenolic resin, at least one outer surface of the laminated structure being of fibrous material impregnated and bonded to the remainder of the structure with a melamine resin, said conductive layer possessing electrical conductivity independent of said resins.

10. A method of making laminated heating elements which comprises positioning electrodes upon a porous electrically conductive layer composed of electrically conducting particles bonded together in an open continuous structure and in electrical contact therewith, covering said electrodes and each surface of said porous conductive layer with at least one outer layer, and bonding together the porous conductive layer and the outer layers with a bonding and impregnating agent to integrate the electrodes and the electrically conductive layer into a substantially unitary and homogeneous laminated structure, said conductive layer possessing electrical conductivity independent of said bonding and impregnating agent.

11. The method of claim 10 in which the porous electrically conductive layer is formed of fibrous material containing graphite dispersed throughout and bonded to non-alkaline colloidal silica particles.

12. A method of making laminated heating elements which comprises positioning electrodes upon a porous electrically conductive layer composed of electrically conducting particles bonded together in an open continuous structure and in electrical contact therewith, covering said electrodes and each surface of said porous conductive layer with at least one outer insulating layer impregnated with a bonding agent, and bonding together under heat and pressure the porous conductive layer and the outer layers to integrate the electrodes, the conductive layer, and the outer layers into a substantially unitary and homogeneous laminated structure, said conductive layer possessing electrical conductivity independent of said bonding agent.

13. A method of making laminated heating elements which comprises positioning electrodes upon a porous electrically conductive layer composed of electrically conducting particles bonded together in an open continuous structure and in electrical contact therewith, covering said electrodes and each surface of said porous conductive layer with at least one outer insulating layer impregnated with a bonding agent, said layer immediately adjacent the conductive layer opposite the electrodes containing excess bonding agent, and bonding together under heat and pressure the porous conductive layer and the outer layers to integrate the electrodes, the conductive layer and the outer layers into a substantially unitary and homogeneous laminated structure, said conductive layer possessing electrical conductivity independent of said bonding agent.

14. A method of making laminated heating elements which comprises positioning electrodes upon a porous electrically conductive layer composed of electrically conducting particles bonded together in an open continuous structure and in electrical contact therewith, said porous conductive layer being impregnated with a bonding agent, covering said electrodes and each surface of said porous conductive layer with at least one outer insulating layer impregnated with a bonding agent, and bonding together under heat and pressure the porous conductive layer, the electrodes and the outer layer to form a substantially unitary and homogeneous laminated structure, said conductive layer possessing electrical conductivity independent of said bonding agent.

15. A laminated heating element comprising at least one porous electrically conductive layer composed of electrically conducting particles bonded together in an open continuous structure and bonded between two layers of highly conductive metal electrodes with a bonding agent and means attached to each of said layers of conductive metal for connection to an electrical source, said conductive layer being completely impregnated with said bonding agent and possessing electrical conductivity independent of said bonding agent.

16. An electrically conductive laminate comprising a plurality of layers of porous electrically conductive material composed of electrically conducting particles bonded together in an open continuous structure in contact with one another to provide a structure of predetermined shape and an adhesive bonding agent bonding the layers of porous electrically conductive material together into a unitary homogeneous electrically conductive laminate which possesses conductivity throughout said bonding agent being uniformly distributed throughout said porous conductive material and said porous conductive material possessing electrical conductivity independent of said bonding agent.

17. The electrically conductive laminate of claim 16 in which electrodes are adhered to an outer face of the laminate.

18. The electrically conductive laminate of claim 16 in which one outer layer is an insulating layer.

References Cited in the file of this patent

UNITED STATES PATENTS

| | | |
|---|---|---|
| 1,873,362 | Tanberg | Aug. 23, 1932 |
| 1,963,554 | McDill | June 19, 1934 |
| 2,022,827 | Ruben | Dec. 3, 1935 |
| 2,252,277 | Tate et al. | Aug. 12, 1941 |
| 2,258,958 | Pearson | Oct. 14, 1941 |
| 2,358,419 | Schumacher et al. | Sept. 19, 1944 |
| 2,473,183 | Watson | June 14, 1949 |
| 2,475,379 | Stong | July 5, 1949 |
| 2,662,957 | Eisler | Dec. 15, 1953 |
| 2,679,569 | Hall | May 25, 1954 |
| 2,683,673 | Silversher | July 13, 1954 |
| 2,688,070 | Freedlander | Aug. 31, 1954 |
| 2,719,907 | Combs | Oct. 4, 1955 |
| 2,797,296 | Fowler et al. | June 25, 1957 |
| 2,803,566 | Smith-Johannsen | Aug. 20, 1957 |